United States Patent [19]
Ritchie, II et al.

[11] Patent Number: 5,407,251
[45] Date of Patent: Apr. 18, 1995

[54] DUMP TRUCK TAILGATE

[75] Inventors: Hale T. Ritchie, II, Wichita, Kans.; Floyd E. Porter, Tulsa, Okla.; Charles H. Asel, Jr., Houston, Tex.; Daniel D. Clarke, Mount Hope, Kans.

[73] Assignee: TruckTech, Inc., Wichita, Kans.

[21] Appl. No.: 22,113

[22] Filed: Feb. 25, 1993

[51] Int. Cl.⁶ .............................. B60P 1/273
[52] U.S. Cl. ........................ 298/23 MD; 298/23 S; 280/43.23
[58] Field of Search ............ 298/23 R, 23 MD, 23 D, 298/23 DF; 280/704, 43.23, 81.6; 180/24.02, 209

[56] References Cited

U.S. PATENT DOCUMENTS

| 1,363,917 | 12/1920 | Read | 298/23 D |
|---|---|---|---|
| 3,191,961 | 6/1965 | Brennan et al. | |
| 3,271,077 | 9/1966 | Timmer et al. | |
| 3,548,540 | 12/1970 | Cullings | 298/23 MD |
| 3,830,542 | 8/1974 | Lablanche | 298/23 MD |
| 3,838,885 | 10/1974 | Brennan et al. | |
| 4,699,428 | 10/1987 | Vick | 298/23 D |
| 4,940,287 | 7/1990 | Ritchie | |
| 4,989,918 | 2/1991 | Biddy | 298/23 MD |

FOREIGN PATENT DOCUMENTS

| 1017767 | 9/1977 | Canada | 180/209 |
|---|---|---|---|
| 1473926 | 5/1977 | United Kingdom | 298/23 DF |

Primary Examiner—David A. Bucci
Assistant Examiner—Gregory A. Morse
Attorney, Agent, or Firm—Don M. Bradley; Shook, Hardy & Bacon

[57] ABSTRACT

A tailgate assembly is disclosed for use with a dump truck which has a bed, two side walls and a bed opening, and also has an obstruction, such as a tag wheel assembly, spaced relatively closely to the bed opening. The assembly comprises a tailgate pivotally connected to hydraulically operated arms for moving the tailgate between open and closed positions. Guides restrict the tailgate to a first substantially rectilinear path of travel and lost-motion connections prevent relative pivoting of the tailgate with respect to the arms to cause outward swinging of the tailgate with respect to the truck bed during a second path of movement to prevent interference between the tailgate and the obstruction during sequential opening of the bed and the raising of the bed to its dumping position.

18 Claims, 3 Drawing Sheets

DUMP TRUCK TAILGATE

FIELD OF THE INVENTION

This invention pertains to dump trucks having a bed and an obstruction spaced relatively closely to the bed, and more particularly, to a novel tailgate system for dump trucks which are equipped with tag wheel assemblies.

BACKGROUND OF THE INVENTION

Governmental restrictions on the load which may be carried by each axle of a dump truck, and other considerations regarding the need to optimize the locations of load bearing axles of such trucks, has led to the use of tag wheel assemblies with such trucks. These assemblies comprise wheels affixed to the truck by means of a rigid bridge which is pivotally connected to the truck and is hydraulically driven from an operative position wherein the wheels of the assembly engage the supporting surface to carry a portion of the load on the truck. to an inoperative position with the bridge and wheels extending upwardly out of the way to permit thee contents of the truck to be dumped where desired.

It is important that the point of pivotal connection of the bridge to the truck frame be positioned as close to the rear end of the truck bed as possible for several reasons. The truck must be able to dump its contents into the hoppers of lay down machines (machines which apply or "lay" road paving materials on the road bed in the construction or refurbishing of streets and highways). Most hoppers of lay down machines are not very long. This requires that the dump truck tailgate be moved relatively close to the lay down machine to effectively dump the truck contents into the hopper. If the tag wheel bridge is positioned a substantial distance rearwardly of the rear end of the truck bed, it will interfere with the positioning of the truck for this purpose.

Additionally, the effective loading and proper positioning of the truck axles is adversely affected if the tag wheel bridge pivot is too far from the rear of the truck. The optimum weight-balance relationship for the truck dictates that this pivot point be as closely spaced to the rear of the truck bed as is structurally possible.

However, if the tag wheel pivot is close to the truck bed, the upright assembly in the standby position interferes with the conventional truck tailgate when the bed is hoisted and the tailgate is raised during the dumping operation. One solution to this problem is shown and described in U.S. Pat. No. 4,940,287 to Ritchie, issued Jul. 10, 1990. The twin tailgates construction with a fixed deflector between the gates disclosed in that patent is workable, and that system has allowed tag wheels to be used in conjunction with dump trucks successfully. However, some disadvantages have been experienced with that solution to the problem. The double tailgate construction is somewhat more costly than that of a single tailgate and some interference with complete emptying of materials from the truck bed has been reported. The deflector or tunnel between the twin tailgates can also retard the flow of some materials from the truck.

One approach which has been tried is to pivot the tag wheel assembly a substantial distance to the rear of the bed to provide room for the swinging of the tailgate and the dumping of the materials between the rear of the bed and the pivot point. This approach has the disadvantages of improper weight distribution on the axles resulting from the large distance between the pivot point and the bed as discussed above. The structure forward of the pivot point which projects rearwardly from the truck also prevents the truck from backing closely to lay down machine hoppers and the like as heretofore discussed.

Positioning the tag wheel assembly so that it is relatively close to the dump bed is therefore highly desirable, but this puts the assembly in position to interfere with the opening of conventional tailgates as required for dumping. Accordingly, a need has arisen for a tailgate which is constructed to operate in a manner to accommodate the close-in position of the tag wheel assembly and yet permit substantially unrestricted dumping of the truck bed.

OBJECTIVES AND SUMMARY OF THE INVENTION

It is therefore a primary objective of this invention to provide a tailgate system for dump trucks which accommodates space restrictions imposed by the relative proximity of a tag wheel assembly or other obstruction at the rear of the truck.

In carrying out the foregoing objective, it is an important object of the present invention to provide a tailgate which operates through a novel path of travel permitting the truck bed to be completely dumped of its contents without the tailgate interfering with the tag wheel assembly throughout the range of movement of the tailgate relative to both the assembly and the bed when the tailgate is opened and closed, as well as throughout the range of movement of the tailgate relative to the assembly when the bed carrying the tailgate is moved to and from its dumping position.

Another very important object of the instant invention is to provide a dump truck tailgate which is capable of achieving the foregoing objects, yet which is relatively easy to operate and which sequences through various different necessary motions as are required for dumping the truck without the need for individual operator attention and control of the respective motions. The attainment of the foregoing objective permits operation of the tailgate by relatively unskilled operators and also minimizes the possibility for damage and injury which might result from improper operator attention.

A further object of the present invention is to provide such a tailgate which accommodates dump trucks equipped with tag wheels, yet which may be opened to whatever predetermined limited extent required to permit spreading of the contents of the truck bed while the truck is in motion.

Another important object of this invention is to provide a tailgate able to achieve the foregoing objects, yet which reliably secures the closing of the truck bed when the tailgate is in its closed position.

In accordance with the foregoing objectives, a tailgate system is disclosed for use with a dump truck having a bed and a bed opening, and an obstruction spaced relatively closely to the opening. The tailgate system generally comprises a closure member and apparatus for moving the closure member between an open and closed position. This moving apparatus comprises means for restricting the movement of the closure member against outward swinging movement relative to the bed during a first path of movement of the closure member and means for causing the closure member to be swung outwardly with respect to the bed during a second path of movement of the closure member to prevent interference between the closure member and the obstruction such as a tag wheel assembly.

In a preferred embodiment, the closure member comprises a generally rectangular tailgate having top, bottom, and two opposing side margins. The swing restricting means comprises a lost-motion connection in the tailgate lifting apparatus including an arcuately movable pivotal connection between the tailgate and the moving means which causes the tailgate to be moved during the first path of movement along a substantially rectilinear path without outward swinging movement of the tailgate when it is being raised during this portion of its path of travel. The swing restricting means also preferably comprises at least one projection member which is secured to the side margin adjacent the bottom margin of the tailgate and a corresponding guide to actively prevent outward or inward movement of the projection member when the dump bed is being raised. The guide is adapted to be secured to one of the side ends of the bed corresponding to the location of the projection member and is sized to receive the projection member.

Also in a preferred embodiment, the moving means comprises at least one elongated, rigid arm. One end of the arm is connected to the closure member by the lost-motion connection, and the other end of the arm is adapted to be pivotally connected to the truck. The moving means further comprises power means operably coupled with the arm for pivoting the later to move the closure member to and from the open and closed positions.

Also in a preferred embodiment, the lost-motion connection comprises pivot means rigidly secured to the closure member and including an abutment member disposed in fixed position with respect to the closure member and carried by the latter for movement therewith. The pivot means pivotally connects the arm to the closure member. An opposing abutment element rigidly secures to the arm in disposition to engage said other abutment member to prevent relative pivoting of the arm and the closure member throughout said second portion of the path of travel. The abutment members are arranged such that the members abut after the closure member completes the first path of movement to prevent inward swinging of the closure member during the second path of movement. This provides for the outward swinging of the closure member by the arm through an arcuate path of travel for the remainder of the movement of the closure member during opening of the latter.

These and other important aims and objectives of this invention will be pointed out or will become apparent in the following explanation and description of the drawings in which like reference numerals designate the same elements.

DETAILED DESCRIPTION OF THE PREFERRED EMBODIMENT

Referring now to the drawings in more detail, numeral 10 generally designates the dump bed of a dump truck which may be a conventional engine-driven dump truck having an operator's cab (not shown) at the front. The dump bed is generally rectangular and includes parallel opposite sides 12 and a horizontal floor 14 (see FIG. 6) which carries the load deposited in the dump bed.

The dump bed 10 may comprise a conventional dump bed including a closure member or tailgate 16 movably mounted to the dump bed 10 between open and closed positions. The dump bed is mounted on a rigid truck frame 20 which is mounted on wheels 22. The dump bed is mounted on frame 20 to pivot up and down about a horizontal dump axis 24 (indicated in FIG. 5).

To mount a tag wheel assembly, as will be subsequently described, the frame 20 is extended by rigidly connecting thereto additional frame members 26 projecting to the rear. The dump bed 10 is connected to the frame 20 for pivotal movement up and down about the horizontal axis 24 as is conventional. A hydraulic piston and cylinder assembly ("cylinder") 30 may be extended to raise the dump bed 10 about the horizontal axis 24 to the raised or dumping position shown in FIG. 5, and the cylinder 30 may be retracted to lower the dump bed onto the frame 20 to the normal transit position of the bed shown in FIGS. 1-4.

Figures 1, 2, 3:
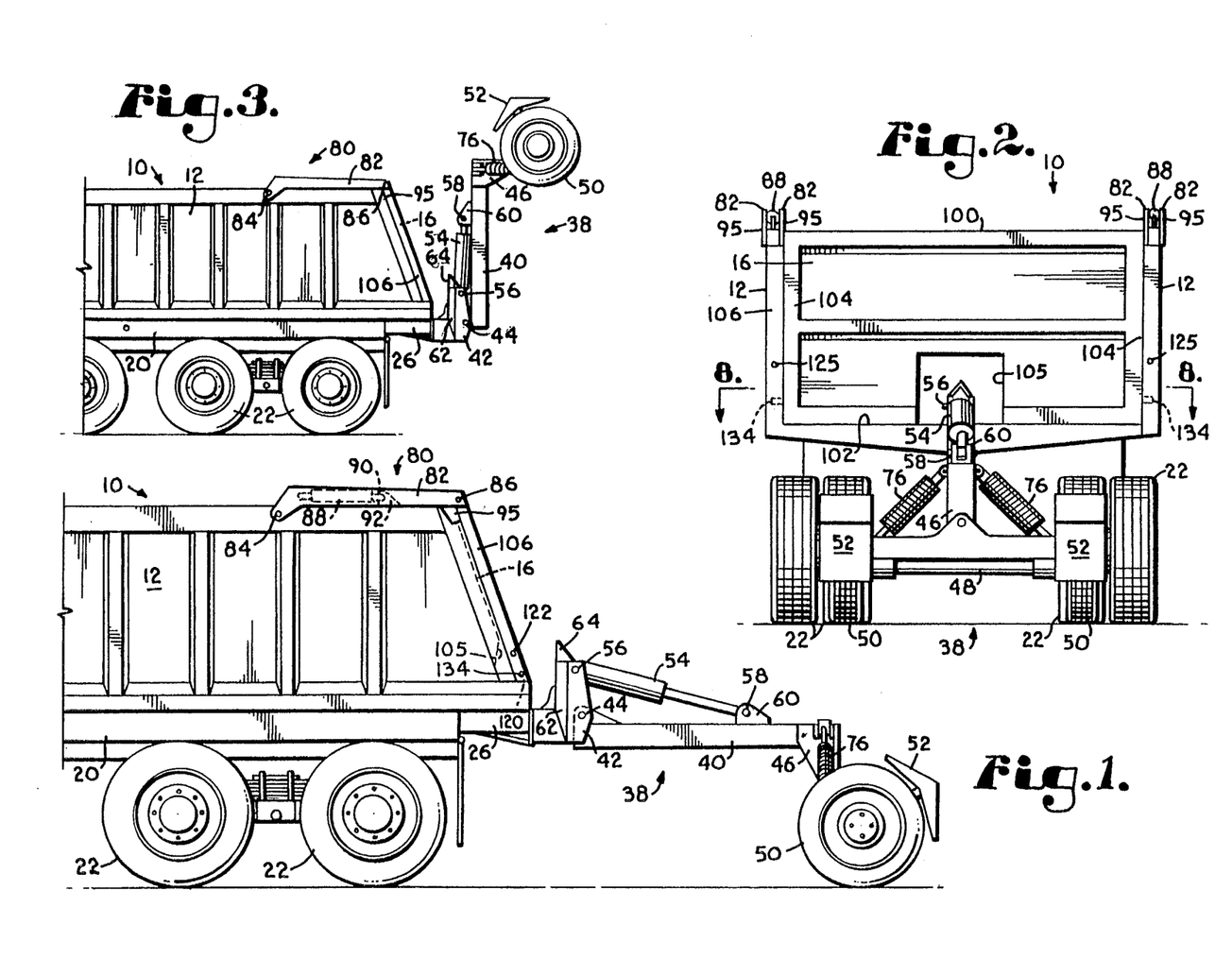
FIG. 1 is a fragmentary, side elevational view of a dump truck equipped with a tag wheel assembly and a tailgate assembly constructed according to a preferred embodiment of the present invention, with the tailgate assembly in a closed position to prevent egress of material from the bed of the dump truck.
FIG. 2 is a rear elevational view of the dump truck and the tailgate assembly shown in FIG. 1.
FIG. 3 is a fragmentary, side elevational view similar to FIG. 1, but on a reduced scale and showing the tag wheel assembly in its raised storage position.

As best seen in FIG. 1, the back end of the dump truck is equipped with a tag wheel assembly identified by the numeral 38 and which is a rigid structure that may be selectively operated to bear part of the load of the dump truck. Tag wheel assembly 38 includes a rigid box beam 40 which is pinned at its forward end between a pair of brackets 42 rigidly carried by frame members 26. A horizontal pivot pin 44 connects beam 40 between the brackets 42 for pivotal movement about the axis of the pin.

At its back end, beam 40 is integrally attached to a rigid bracket 46 which carries an axle 48 (shown in FIG. 2). On its opposite ends, the axle 48 carries a pair of wheels 50 which are preferably castered and linked together. Wheel guards 52 are mounted on axle 48 and are positioned behind wheels 50.

Figures 4, 5, 6, 7, 8:
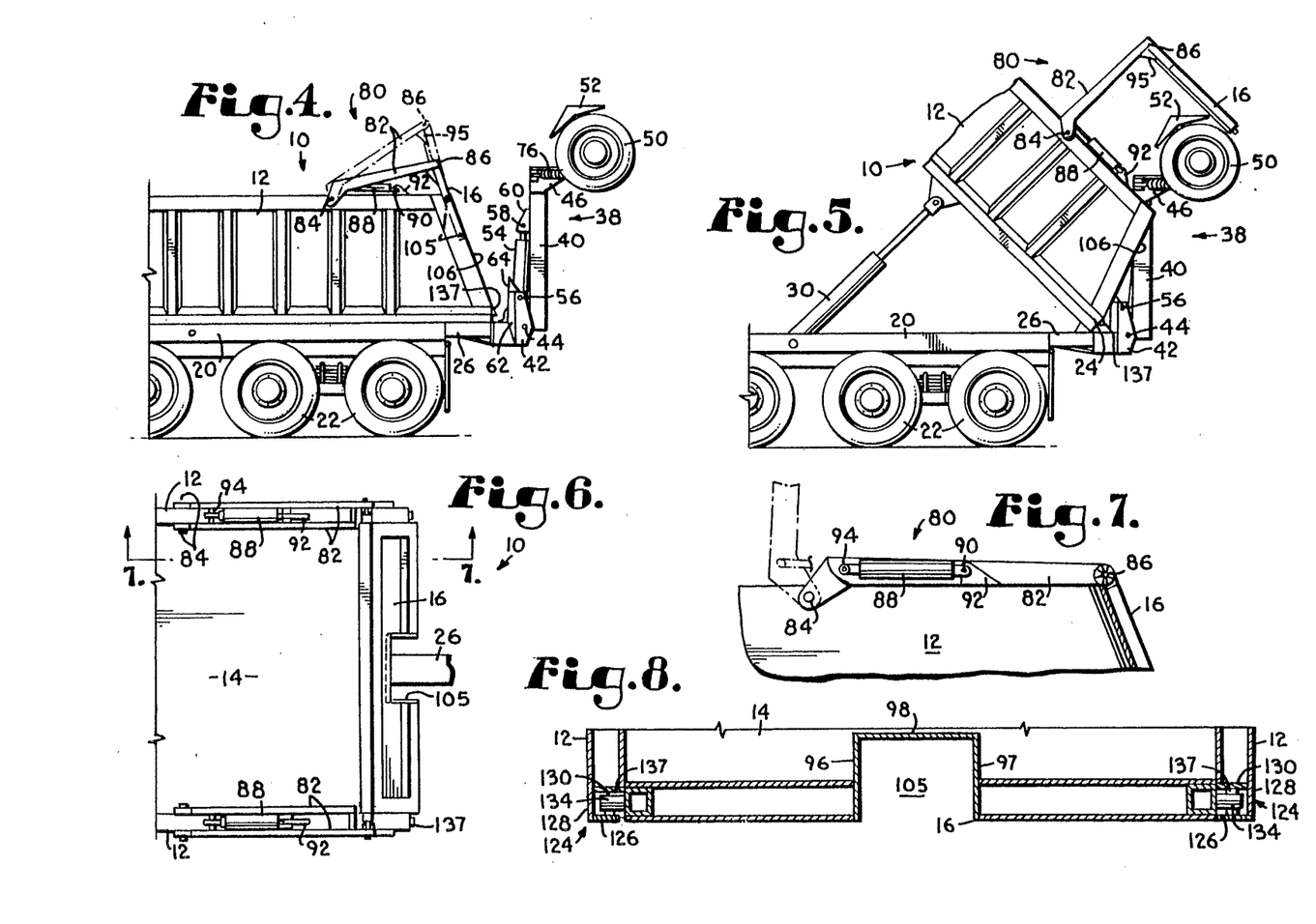
FIG. 4 is a view similar to FIG. 3, but showing the tailgate assembly being actuated through a first path of movement.
FIG. 5 is a view similar to FIGS. 3 and 4, but showing the bed of the dump truck in its raised position and the tailgate assembly in the fully open position.
FIG. 6 is a fragmentary, top plan view on a reduced scale of the truck of FIG. 1 showing the tailgate assembly in the closed position.
FIG. 7 is a detailed fragmentary sectional view taken generally along the plane of line 7—7 of FIG. 6 in the direction of the arrows.
FIG. 8 is a fragmentary sectional view taken generally along the plane of line 8—8 of FIG. 2 in the direction of the arrows.
Figure 9:
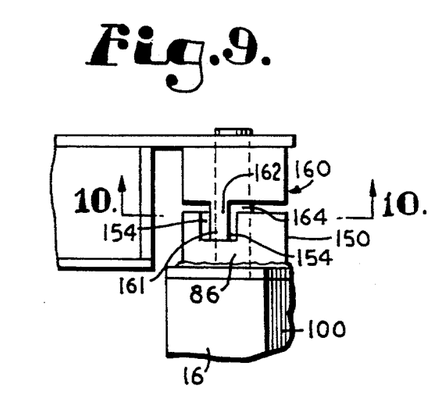
FIG. 9 is an enlarged, fragmentary, top plan view of the pivotal connection of the tailgate to the dump truck.

The pivotal connection provided by the pivot pin 44 permits the assembly 38 to be pivoted up and down between the raised or stored position shown in FIGS. 3-5 and the load bearing position shown in FIGS. 1-2. In the fully raised standby position, the beam 40 extends substantially straight upwardly above the pivot pin 44. In this position the assembly 38 adds relatively minimally to the overall length of the dump truck and it does not significantly inhibit its maneuverability. Preferably, pivot pin 44 is spaced about 8 inches horizontally rearwardly from the proximal end of the dump bed to achieve appropriate weight distribution for the truck axles when the tag wheel assembly is in its operative or load bearing position and to minimize the vertical height and rearwardly projecting dimensions of the vehicle when the assembly is in its standby position. In the load bearing position of the assembly, beam 40 extends generally horizontally to the rear from the pivot pin 44, and the wheels 50 travel along the roadway behind the dump truck so that the frame bears part of the load of the truck.

The assembly 38 is raised and lowered by a hydraulic piston and cylinder assembly ("cylinder") 54 having its base end pinned at 56 to the brackets 42. The opposite or rod end of the cylinder is pivotally pinned at 58 between a pair of bracket plates 60 and secured to the rear end portion of beam 40. Cylinder 54 exerts whatever downward force on the assembly 38 which is desired to have the tag wheels bear an appropriate part of the load when the dump truck is in transit. When the cylinder 54 is retracted, pin 58 orbits about pin 44, and the beam 40 may thus be pivoted through an arc of 90° to the raised or storage position of the assembly 38.

The assembly 38 also comprises deflectors for diverting material egressing from the dump bed around the assembly 38. during a dumping operation. A deflector 62 is attached to plates 42, and a deflector 64 is attached to deflector 62, as well as plates 42. Preferably, the deflectors 62 and 64 are formed integrally as one piece with the plates 42. An additional deflector (not shown) can also be secured to cylinder 54 as, for example, by bolted straps to deflect materials dumped from the bed around cylinder 54.

The assembly 38 also comprises shock absorbers 76 secured between the rigid bracket 46 and the axle 48. The shock absorbers provide a dampening effect to stabilize the wheels 50 against erratic movement and to permit relative pivoting of axle 48 to accommodate uneven road surfaces.

The present invention pertains to a tailgate assembly which automatically actuates the tailgate 16 between an open position in which the contents of the bed 10 can be dumped from the truck and a closed position for hauling materials in the bed of the truck. Particularly, the tailgate assembly which embodies the principles of this invention provides for automatic closing and opening of the tailgate 16 without interference with an obstruction such as the tag wheel assembly 38.

The tailgate assembly includes structure for moving the tailgate between the closed position (shown in FIG. 3), a partially open position during a first path of movement (shown in FIG. 4), and an open position (shown in FIG. 5). The structure also provides for return movement of the tailgate to the closed position. In a preferred embodiment, arms 80 are utilized to move the tailgate 16 between its open and closed positions. There is one arm 80 for each respective side 12 of the dump bed 10. As best shown in FIG. 6, each arm 80 comprises a pair of parallel rigid arm plates 82. The arm plates 82 are pivotally secured to the sides 12 of the dump bed 10 by pins 84 at the distal end of each arm 80. The arms 80 are secured to the tailgate 16 by pins 86 at the proximal end of each arm 80.

Hydraulic piston and cylinder assemblies ("cylinders") 88 actuate the arms 80 between a lowered position in which the tailgate is in the closed position (shown in FIG. 1) and a raised position in which the tailgate is in the open position (shown in FIG. 5). The base end of each cylinder 88 is pivotally pinned at 90 to a bracket 92 rigidly carried by the side 12 of the dump bed 10. The opposite or rod end of the cylinder 88 is pivotally connected to pinned arm plates 82 of arm 80 by a transversely extending pin 94 intermediate the ends of arm 80. When the cylinder is fully extended, arm 80 is in its raised position (as shown in FIG. 5).

Also, spaced apart, depending plate members 95 are rigidly secured to and carried by each of the arm plates 82 for arms 80. Plate members 95 straddle the upper margin of the bed to restrict lateral movement of the tailgate and the arms 80 when the tailgate is in the closed position.

Tailgate 16 is generally rectangular having a top margin 100, a bottom margin 102, and side margins 104 (as shown in FIG. 2). Tailgate 16 is preferably provided with an inwardly extending recess 105 of generally rectangular cross-section for accommodating the brackets 42 and diverters 62–66 of the tag wheel assembly 38 when the truck bed is elevated without the tailgate having been moved to its fully opened position. The recess is wedge-shaped and is formed of triangular side walls 96 and 97 and a rectangular back wall 98 (shown in FIG. 8). The triangular side walls 96 and 97 and the rectangular back wall 98 extend upwardly and connect to the tailgate 16 to form the V-shaped recess (as shown by the phantom lines in FIG. 1).

The arms 80 are pinned at 86 to the opposing side margins 104 of tailgate 16 adjacent the top margin 100 of the tailgate. When actuated by the hydraulic cylinders 88, arms 80 move the tailgate 16 through a first path of substantially rectilinear movement along the length of the back side ends 106 of the sides 12 of dump bed 10. Typically, the back side ends 106 extend angularly upward away from the assembly 38 at an angle of about 80° from the horizontal.

Structure is provided to restrict the movement of the tailgate 16 against inward or outward swinging movement relative to the bed 10 during the first path of movement, defined between points 120 and 122 shown in FIG. 1, to permit opening of the tailgate only a predetermined limited distance, if desired, and to prevent inadvertent interference between the tailgate 16 and the tag wheel assembly 38. In the preferred embodiment, the swing restricting means includes the pivotal connection by pins 86 of the tailgate 16 to the arms 80. The pivotal connection allows relative pivoting between the arms and the tailgate as the arms raise the tailgate 16 upwardly without causing the tailgate 16 to swing outwardly and interfere with the assembly 38. As best shown in FIG. 4, when the tailgate is in the closed position, the tailgate 16 and the arms 80 form an obtuse angle. As the arms 80 raise the tailgate 16 upwardly, the angle between the tailgate 16 and the arms 80 decreases. When the tailgate 16 is moved to the end of the first path of movement, the angle between the tailgate 16 and the arms 80 is approximately 90°. As will be described below, after completing the first path of movement, means is provided for preventing further pivotal movement of the tailgate 16 towards the arms 80 after the tailgate 16 is moved through the first path of movement.

Also, in the preferred embodiment, the swing prevention means includes channel-shaped guides 124 secured to each of the bed side ends 106 (best shown in FIG. 8). Each guide 124 is comprised of walls 126, 128, and 130, and defines an elongated opening 132. The guide opening 132 extends angularly upwardly and parallel to its corresponding side end 106, and is sized to receive a corresponding projection 134 carried by tailgate 16. The projection 134 is secured to and projects from one side of the tailgate and another projection 134 is likewise positioned at the other side of the tailgate. The projections 134 are positioned proximal the bottom margin 102 of the tailgate as best shown in FIG. 2. As may be seen in FIG. 1, the projection 134 moves from point 120 to point 122 when the arms 80 raise the tailgate 16. Point 122 may coincide with the end of the first path of movement defined by the length of the guides 124. Thus, the tailgate 16 is no longer restricted by the guides against swinging movement relative to the bed 10 when raised above point 122. It can therefore be seen that the projections restrict the bottom of the tailgate 16 to rectilinear movement during the first path of movement. The arms 80 raise the top of the tailgate through a substantially rectilinear and slightly arcuate path during the first path of movement. Also, when the tailgate is in the closed position, projections 134 engage against wedges 137 positioned at the bottom of guide openings 132 to prevent inadvertent raising of tailgate 16.

Following the first path of movement, the arms 80 may continue lifting the tailgate 16 through a second path of movement. Structure is provided to prevent relative pivoting of the tailgate 16 with respect to the arms 80 during the second path of movement to prevent interference between the tailgate 16 and the tag wheel assembly 38 when the truck bed is raised for dumping. In a preferred embodiment, the swinging prevention structure comprises two pair of first and second opposing members. The first and second opposing members interact to form a clutch-like device which prevents relative pivoting between the tailgate 16 and the arms 80 during a portion of the path of travel of the arms 80 as they are being raised and lowered.

Referring to FIGS. 9–12 of the drawings, pins 86 are rigidly secured to the side margins 104 of tailgate 16 proximal the top margin 100 of the tailgate. Arms 80 are pivotally attached to tailgate 16 by pins 86, but the latter are secured against rotational movement with respect to the tailgate. A first opposing member 150 is rigidly secured to each side margin 104 of tailgate 16 and includes an central bore through which the pin 86 extends. The first opposing member 150 is in the nature of a cylindrical block having one or more pie-shaped slots 1.52 formed therein. Each slot 152 presents opposing faces 154. Second opposing members 160 are carried by arms 80 on the outer plates 82 thereof. Members 160 are generally of cylindrical construction and include rigid blocks 161 which project outwardly into the pie-shaped slots of the associated facing member 150. Each block 161 has a top 162, and opposing faces 164.

Figure 10:
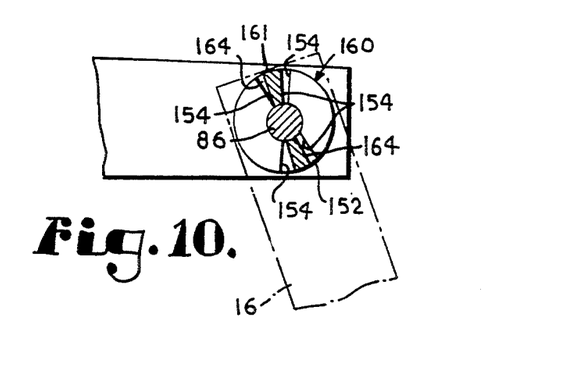
FIG. 10 is a detailed, fragmentary sectional view taken generally along the plane of line 10—10 of FIG. 9 in the direction of the arrows.
Figure 11:
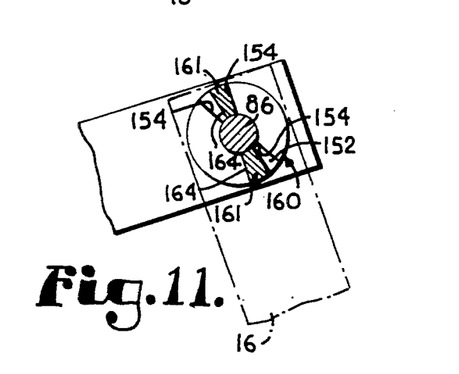
FIG. 11 is a view similar to FIG. 10, but showing different positions of the components of the pivotal connection of the tailgate to the dump truck.

FIG. 10 illustrates the positioning of the opposing faces 154 and 164 during the first path of movement. As the arms 80 lift the tailgate 16 through the first path of movement, opposing faces 164 of the second opposing member 160 rotate with arm 80 as the latter pivots about pin 86 toward the opposing faces 154 of the first opposing member 150. When the tailgate 16 is moved to the end of the first path of movement at point 122, the opposing faces 154 and 164 meet as shown in FIG. 11. The engagement of the opposing faces 154 and 164 prevents the tailgate from angularly swinging downwardly under the influence of gravity as the arms 80 continue to raise the tailgate 16 through the second path of movement (see FIGS. 11 and 12). Swinging of the tailgate in the opposite direction is prevented by gravity acting on the tailgate. Arms 80 will continue to raise the tailgate 16 through its second path of movement to the fully raised position shown in FIG. 5. Likewise, when the tailgate 16 is returned to its fully lowered position, the opposing faces 164 rotate in the opposite direction to contact the other opposing faces 154.

With the tailgate 16 and arms 80 in the fully raised position, the hydraulic cylinder 30 can be actuated to raise the dump bed 10 to the fully raised dump position without interference of the tailgate 16 with the tag wheel assembly 38. The relative positions of the components in the fully raised position are shown in FIG. 5 of the drawing. Thus, the tailgate assembly provides means for causing the tailgate to be swung outwardly with respect to the bed during the second path of travel to prevent interference between the tailgate and the tag wheel assembly when the tailgate is moved with the bed relative to the tag wheel assembly during a dumping operation.

Figure 13:
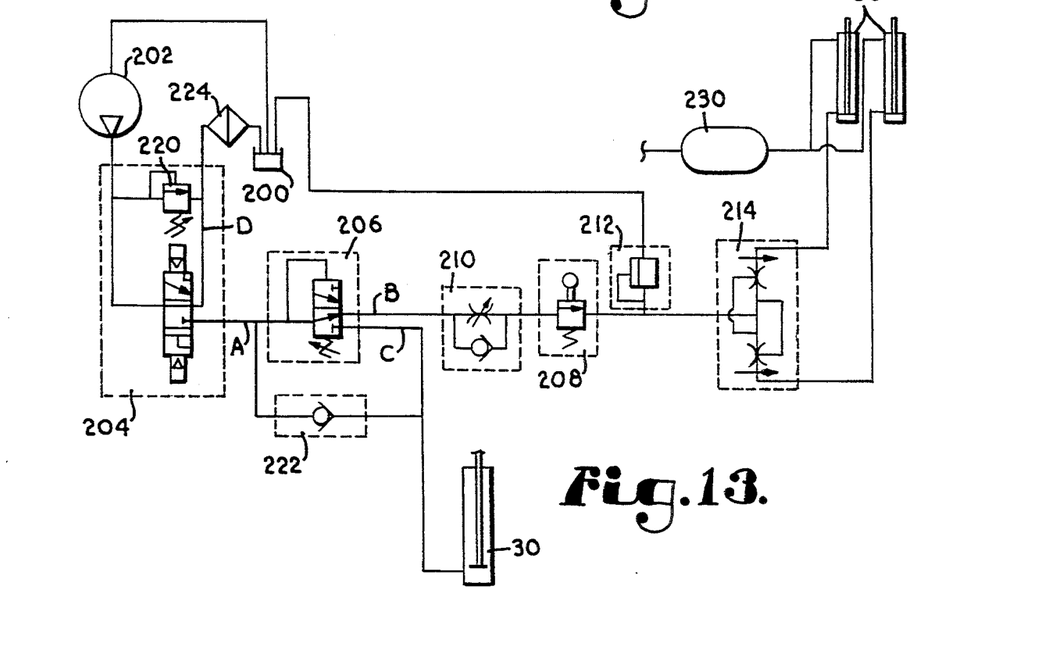
FIG. 13 is a schematic diagram of the hydraulic control system for operation of the tailgate assembly and truck bed.

Referring now to FIG. 13, a hydraulic control system schematic diagram is shown for controlling the hydraulic cylinders 30, 88, and 54. A fluid reservoir 200 supplies hydraulic fluid to the hydraulic lines via control switches. A pump 202 may operate continuously during the dump cycle of the truck, and causes fluid from the reservoir 200 to be pumped through the lines to the cylinders. A manually operable control valve 204 is connected to the pump 202. The operator may manually shift the control valve to operably connect the pump to the main hydraulic line A. A pressure-responsive sequence valve 206 is interposed between line A and line B. The normal position of valve 206 connects the lines for conducting pressurized fluid to cylinders 88 to raise arms 80 and thus the tailgate 16. The sequence control valve prevents flow of fluid to the hoist cylinder 30 until a predetermined amount of pressure is built up in the line.

Plunger valve 208 is a spring-loaded valve which connects and disconnects line B from the cylinders 88 of the arms 80. When the dump bed 10 is in its lowered position, the plunger valve 208 permits the flow of fluid through line B to the cylinders 88. When the hoist 30 raises the dump bed 10 off of the plunger valve 208, the latter is spring biased to automatically disconnect fluid line B from cylinders 88. This prevents backflow of fluid to keep the tailgate in the raised position.

A flow control valve 210 is also provided to allow adjustment of the rate at which the tailgate 16 may be raised. A relief valve 212 is connected between the reservoir 200 and the output of the plunger valve 208 to shunt the sequence valve 206. The relief valve 212 allows fluid to flood back to the reservoir from the cylinders 88 to relieve the pressure in excess of a predetermined pressure needed to hold the tailgate in the raised position. A flow divider-combiner valve 214 is connected between the cylinders 88 and the output of valve 208. The valve 214 ensures that equal hydraulic pressure is applied to the two cylinders 88 which drive the arms 80. Thus, the arms 80 lift the tailgate 16 with equal force and avoid any tendency to skew the tailgate.

When the tailgate reaches its fully open position at which the lifting cylinders 88 bottom out, the pressure in the lines to the cylinders 88 rises to a level which causes sequence valve 206 to disconnect line A from line B, thereby stopping fluid flow to cylinders 88. Simultaneously, valve 206 connects line A to line C to apply fluid to the main bed hoisting cylinder 30. This action causes cylinder 30 to raise the truck bed. Control valve 204 includes a normally closed, pressure-operated relief valve 220 which automatically shunts fluid flow in the circuit and stops fluid flow from the pump to cylinder 30 when the cylinder bottoms out or should an obstruction interfere to the fully raised position of the dump bed. Control valve 204 can, of course, be manually shifted to a position stopping the lift at any desired position. Valve 206 also operates to shunt from the pump to the reservoir when the control valve is in such position.

At times it my be desired to stop the tailgate at a position short of its fully raised position. For example, it is often necessary for the truck to dump its contents while the truck is moving to scatter the contents behind the truck and over some linear distance. This action is commonly referred to as "tailgating" and usually requires that the tailgate be opened only a predetermined distance to control the outflow of material to that appropriate to the speed of the truck to accomplish the desired thickness of the material on the receiving surface.

Channel guides 124 for tailgate projections 134 are preferably provided with a series of vertically spaced apart, aligned pairs of holes 125 through front and rear walls 126 and 130 of the guides. Holes 125 are best seen in FIG. 2 of the drawing, wherein it is shown that there are holes 125 on each side of the tailgate at equal distances from the bottom of tailgate.

A corresponding hole 125 on each respective side of the tailgate is adapted to receive therein a suitable pin (not shown) disposed to be engaged by its corresponding projection when the tailgate is raised. In other words, each projection 134 engages a corresponding pin and this physically blocks the tailgate from being raised further. This restricts the tailgate opening to that limited amount provided by virtue of the selected locations for the stop pins.

When projections 134 engage their respective stop pins, pressure in the hydraulic lines to cylinders 88 rises as if the cylinders had bottomed out. This rise in pressure operates sequence valve 206 to result in applying pressurized fluid from the pump to the hoist cylinder 30 as heretofore described. It will thus be apparent that the operation of the system is the same, whether the tailgate is fully raised or it is stopped at some predetermined intermediate position.

After a dumping operation has been completed, it is necessary to lower the truck bed 10 and the tailgate 16 to the closed position. The control valve 204 can be manually shifted to connect line A to the return line D to the reservoir. Note also that the pump is connected to the return line D to permit it to continue operating and dumping oil back into the reservoir. The hoist cylinder 30 dumps fluid back into the reservoir through check valve 222, which is connected in parallel to sequence valve 206. A filter 224 is preferably connected in the return line D to prevent foreign material from entering into the hydraulic fluid reservoir 200.

Figure 12:
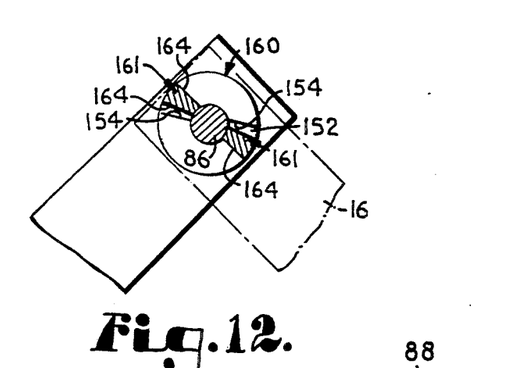
FIG. 12 is a view similar to FIG. 10, but showing the components in a position raised slightly above that shown in FIG. 11.

When dump bed 10 returns to the down position, the plunger valve is once again opened to connect cylinders 88 to reservoir 200 through line B, thereby allowing the hydraulic fluid to drain back into the reservoir through sequence valve 206. Generally, gravity will assist in moving the relatively heavy tailgate back to the closed position by forcing hydraulic fluid from the tailgate cylinders 88. Nevertheless, compressed air from the truck's air pressure system 230 must normality be directed into cylinders as shown in FIG. 12 to force cylinders 88, and thus tailgate 16, to the fully closed position.

Operation

The novel tailgate system disclosed herein allows dump trucks to be equipped with relatively closely positioned tag wheel assemblies, such as assembly 38, and yet allows the dump truck to perform dumping operations while the tag wheel assembly is in the raised position adjacent the opening of the dump bed 10. In operation, the user can manually activate the control valve 204 to cause the tailgate 16 to be raised to the fully opened position shown in FIG. 5 to perform a dumping operation or to a semi-open position, as shown in FIG. 4, to perform a "tailgating", material spreading operation.

Having described the preferred embodiment of the invention with reference to the accompanying drawings, it is to be understood that the invention is not limited to the precise embodiment disclosed, and that various changes and modifications may be effected therein by one skilled in the art without departing from the scope or spirit of the invention as defined in the appended claims.

What is claimed is:

1. A tailgate assembly for use with a dump truck comprising a bed having two side walls with side ends and a bed opening, said tailgate assembly comprising:

a closure member adapted to be moved between a closed position in disposition blocking egress of material from the bed through said opening, and an open position permitting egress of material, the closure member comprising top, bottom and side margins, and a projection member extending outwardly from each of the side margins of the closure member adjacent the bottom margin of the closure member;

at least two arm members having proximal and distal ends, one arm member being adapted to be pivotally secured at its distal end to one of the side walls of the bed and the other arm member being adapted to be pivotally secured at its distal end to the other of the side walls of the bed, the proximal end of each arm member being operably coupled with a corresponding side margin of the closure member adjacent the top margin of the closure member to form a pivotal connection between the proximal end of the arm member and the closure member;

at least two power means, each power means being secured to a respective one of the arm members to move the arm member between a raised position in which the closure member is in the open position and a lowered position in which the closure member is in the closed position;

a pair of guides to restrict the movement of the closure member against swinging movement relative to the bed during a first path of movement of the closure member, one guide being adapted to be secured to each side end of the side walls of the bed of the dump truck, each guide being sized to receive one of the projection members of the closure member; and the coupling of said arm members to the closure member including means for causing outward swinging of the closure member with respect to the bed during a second path of movement of the closure member, said swing causing means comprising two pair of first and second opposing members, the first opposing members being adapted to be secured to respective ones of the side margins of the closure member and the second opposing members being secured to respective ones of the arm members adjacent the pivotal connection of the closure member to the arm member, such that the first and second opposing members contact each other after the closure member completes the first path of movement to prevent relative swinging of the closure member with respect to said arms during the second path of movement.

2. For use with a dump truck having a bed opening, a tailgate assembly for selectively closing said opening, said tailgate assembly comprising:

a closure member mounted on the bed for movement therewith and for movement between a closed position in disposition blocking egress of material from the bed through said opening, and an open position permitting egress of material, the closure member having top, bottom and side margins;

at least one elongated, rigid arm having a pair of ends, one end of the arm being pivotally coupled to the bed in spaced relationship from the closure member;

power means pivotally connected with the arm for swinging the other end of said arm with respect to the bed; and means interconnecting said other end of the arm with one of the side margins of the closure member, said interconnecting means including a lost motion connection between the arm and the closure member, said connection being operable to permit relative pivoting of the closure member with respect to the arm during a first predetermined portion of the arm swing and to prevent relative pivoting of the closure member relative to the arm during a second predetermined portion of the arm swing, whereby the closure member may be moved on a substantially rectilinear path of travel by the swinging arm during said first portion of the arm swing and the closure member may be swung outwardly from the bed by the arm during said second portion of the arm swing.

3. A tailgate assembly as set forth in claim 2, wherein said lost-motion connection comprises pivot means rigidly secured to the closure member and including an abutment member disposed in fixed position with respect to the closure member and carried by the latter for movement therewith, said pivot means pivotally connecting the arm to the closure member, and an opposing abutment element rigidly secured to the arm in disposition to engage said abutment member to prevent relative pivoting of the arm and the closure means throughout said second portion of the path of travel.

4. A tailgate assembly as set forth in claim 3, wherein said abutment member and said abutment element are each configured and disposed to permit the arm to pivot freely with respect to the closure member throughout said first portion of the path of travel.

5. A tailgate assembly as set forth in claim 1, wherein said assembly includes guide means carried by the truck bed and operably coupled with the closure member to hold the latter against outward swinging with respect to the bed when the member is swung during said first portion of the arm swing.

6. A tailgate assembly as set forth in claim 5, wherein said guide means is operable to limit the movement of the closure member to substantially rectilinear movement throughout said first portion of the path of travel.

7. A tailgate assembly as set forth in claim 6, wherein said guide means comprises an elongated, rigid guide member secured to said truck bed adjacent a side of said bed opening, said guide member having a longitudinally extending slot, and a projection means carried by the closure member and extending into said slot for sliding movement along the latter, said guide member being disposed to restrict the movement of said projection to movement along the slot during said first portion of the arm swing to prevent outward swinging of the closure member.

8. A tailgate assembly as set forth in claim 2, wherein said power means includes control means operably coupled with said assembly and adapted to be coupled with the dump truck to automatically ensure that the closure member is moved to open the bed opening before the truck bed may be elevated to its dumping position.

9. A tailgate assembly as set forth in claim 8, wherein the assembly includes means for limiting the movement of the closure member to a predetermined position only partially unblocking said opening to permit egress of said material at a restricted rate, said control means automatically permitting movement of the truck bed to said dumping position when the closure member reaches said predetermined position.

10. A tailgate assembly for use with a dump truck having a bed having two side walls with side ends and a bed opening, said tailgate assembly being adapted to be mounted on the bed for movement therewith, the assembly comprising:

a closure member adapted to be moved between a closed position in disposition blocking egress of material from the bed through said opening, and an open position permitting egress of material;

means for moving the closure member between the open and closed positions, the moving means including at least one elongated rigid arm having a pair of ends, one of said arm ends adapted to be pivotally coupled to the bed with the other end being swingable outwardly from the bed, and power means including a fluid and piston assembly pivotally coupled with the arm and adapted to be pivotally coupled to the bed for swinging the arm with respect to the bed;

lost motion means for restricting the movement of the closure member against swinging movement relative to the bed during a first path of movement of the closure member and for causing outward swinging of the closure member with respect to the bed during a second path of movement of the closure member, said lost motion means comprising a connector interconnecting the other end of said arm with the closure member for movement of the member with the arm, said connector being operable to provide free relative pivoting of the arm with respect to the member as the latter is moved along said first path of movement, and to prevent relative pivoting between the arm and the closure member when the latter is moved on said second path of movement.

11. The tailgate assembly of claim 10, wherein the closure member comprises a generally rectangular tailgate having top, bottom, and two opposing side margins.

12. The tailgate assembly of claim 11 wherein the restricting means comprises at least one projection member secured to the side margin adjacent the top margin of the closure member and at least one guide to prevent swinging movement of the projection member, the guide being adapted to be secured to one of the side ends of the bed corresponding to the location of the projection member and being sized to receive the projection member within the guide.

13. The tailgate assembly of claim 12, wherein the side ends of the bed extend angularly upward away from the obstruction.

14. The tailgate assembly of claim 13, wherein the moving means comprises at least two arm members having proximal and distal ends, the proximal end of each arm member being pivotally connected to one of the side margins of the closure member and the distal end being pivotally connected to one of the side ends of the bed, the moving means further comprising at least two power means, each power means being connected to one of the arm members for automatically raising the arm member between a lowered position in which the closure member is in the closed position and a raised position in which the closure member is in the open position.

15. The tailgate assembly of claim 14, wherein the lost motion means comprises two pair of first and second opposing members, one first opposing member being secured to each of the side margins adjacent the top margin of the closure member and one second opposing member being secured to each of the arm members adjacent the pivotal connection of the closure member to the arm member, such that the corresponding first and second opposing members contact each other after the closure member completes the first path of movement to prevent inward swinging of the closure member as the latter is swung outwardly of the bed by said arm members during the second path of movement.

16. The tailgate assembly of claim 15, wherein each of the first and second opposing members comprises block members having opposing faces, the opposing face of the first opposing member rotates angularly toward the opposing face of the corresponding second opposing member during the first path of movement of the closure member, and abuts the opposing face of the second opposing member after the first path of movement is completed.

17. The tailgate assembly of claim 16, wherein the power means comprises at least two hydraulic cylinders, one hydraulic cylinder corresponding to each side wall of the bed and connected between the side of the bed and the distal end of the corresponding arm member.

18. The tailgate assembly of claim 17, wherein the restricting means comprises a pair of projection members, one member being secured to each side margin adjacent the bottom margin of the tailgate, and a pair of guides corresponding to the projection members, each guide being secured to one of the side ends of the bed and being sized to receive the corresponding projection member.

* * * * *